US012135514B2

(12) United States Patent
Somete

(10) Patent No.: US 12,135,514 B2
(45) Date of Patent: Nov. 5, 2024

(54) TONER CONVEYING DEVICE THAT CONVEYS WASTE TONER REMOVED FROM A SURFACE OF AN IMAGE CARRIER OR TONER TO BE REPLENISHED TO A DEVELOPING DEVICE, AND CLEANING DEVICE AND IMAGE FORMING APPARATUS PROVIDED THEREWITH

(71) Applicant: KYOCERA Document Solutions Inc., Osaka (JP)

(72) Inventor: Maki Somete, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/248,564

(22) PCT Filed: Oct. 5, 2021

(86) PCT No.: PCT/JP2021/036781
§ 371 (c)(1),
(2) Date: Apr. 11, 2023

(87) PCT Pub. No.: WO2022/080181
PCT Pub. Date: Apr. 21, 2022

(65) Prior Publication Data

US 2023/0408953 A1 Dec. 21, 2023

(30) Foreign Application Priority Data

Oct. 12, 2020 (JP) ................................ 2020-171628

(51) Int. Cl.
*G03G 15/08* (2006.01)
*G03G 21/00* (2006.01)
*G03G 21/10* (2006.01)

(52) U.S. Cl.
CPC ..... *G03G 15/0891* (2013.01); *G03G 21/0005* (2013.01); *G03G 21/105* (2013.01);
(Continued)

(58) Field of Classification Search
CPC ........... G03G 15/0891; G03G 21/0005; G03G 21/105; G03G 15/08; G03G 21/00;
(Continued)

(56) References Cited

U.S. PATENT DOCUMENTS

2010/0143011 A1* 6/2010 Tawada ............... G03G 21/007
399/358
2017/0343953 A1 11/2017 Oi
(Continued)

FOREIGN PATENT DOCUMENTS

JP H 04-172484 A 6/1992
JP 2005077675 A * 3/2005
(Continued)

*Primary Examiner* — Arlene Heredia
*Assistant Examiner* — Laura Roth
(74) *Attorney, Agent, or Firm* — Stein IP, LLC

(57) ABSTRACT

A toner conveying device (7*a* to 7*d*) includes a toner conveying path (26), a conveying screw (29), and a flicker (31). The conveying screw (29) includes a rotation shaft (29*a*) and a helical blade (29*b*) formed on an outer circumferential surface of the rotation shaft (29*a*). The flicker (31) includes a plurality of first contact pieces (33) that press the conveying screw (29) in a first direction toward a bottom of the toner conveying path (26), and a plurality of second contact pieces (34) that contact the conveying screw (29) from a side opposite to the first contact pieces (33) and press the conveying screw (29) in a second direction opposite to the first direction. A force with which the first contact pieces (33) press the conveying screw (29) is greater than a force with which the second contact pieces (34) press the conveying screw.

9 Claims, 8 Drawing Sheets

(52) U.S. Cl.
CPC ............... *G03G 2215/0827* (2013.01); *G03G 2221/1624* (2013.01)

(58) Field of Classification Search
CPC ....... G03G 15/0893; G03G 2215/0827; G03G 2215/0838; G03G 2215/0841; G03G 2221/1624
See application file for complete search history.

(56) References Cited

U.S. PATENT DOCUMENTS

| | | | | |
|---|---|---|---|---|
| 2022/0308501 | A1* | 9/2022 | Kadota | G03G 21/105 |
| 2022/0308518 | A1* | 9/2022 | Saito | G03G 21/0011 |
| 2022/0308519 | A1* | 9/2022 | Takagami | G03G 21/105 |
| 2023/0375963 | A1* | 11/2023 | Kadota | G03G 21/0035 |

FOREIGN PATENT DOCUMENTS

| | | | | |
|---|---|---|---|---|
| JP | 2005-128203 | A | | 5/2005 |
| JP | 2006-343371 | | | 12/2006 |
| JP | 2007147773 | A | * | 6/2007 |
| JP | 2010128437 | A | * | 6/2010 |
| JP | 2017-215436 | A | | 12/2017 |
| JP | 2017215437 | A | * | 12/2017 |
| JP | 2022150540 | A | * | 10/2022 |

* cited by examiner

TONER CONVEYING DEVICE THAT CONVEYS WASTE TONER REMOVED FROM A SURFACE OF AN IMAGE CARRIER OR TONER TO BE REPLENISHED TO A DEVELOPING DEVICE, AND CLEANING DEVICE AND IMAGE FORMING APPARATUS PROVIDED THEREWITH

CROSS-REFERENCE TO RELATED APPLICATIONS

This application is a national stage of International Application No. PCT/JP2021/036781, filed Oct. 5, 2021, which claims the benefit of Japanese Application No. 2020-171628, filed Oct. 12, 2020, in the Japanese Patent Office, the disclosures of which are incorporated herein by reference.

TECHNICAL FIELD

The present invention relates to a toner conveying device that conveys waste toner removed from a surface of an image carrier or toner to be replenished to a developing device, and a cleaning device and an image forming apparatus that are provided with the toner conveying device.

BACKGROUND ART

In image forming apparatuses such as copiers, printers, facsimile machines, etc. that employ an electrophotographic method, powder developers are typically used, and in a process generally performed in such image forming apparatuses, an electrostatic latent image formed on an image carrier such as a photosensitive drum is visualized with toner included in a developer stored in a developing device, the toner image is transferred onto a recording medium, and then the toner image is fixed on the recording medium through a fixing process. Such image forming apparatuses incorporate a cleaning device for removing residual toner from a surface of the photosensitive drum.

In such a cleaning device, waste toner collected from the surface of the photosensitive drum is subject to mechanical stress due to which the adhesion state and the particle diameter of an external additive become uneven, and further, foreign matter such as paper powder becomes mixed into the waste toner, as a result of which the waste toner deteriorates in fluidity and is liable to solidify. Furthermore, along with the recent trend for increasingly lower toner melting points, toner has become liable to deteriorate in fluidity under high-temperature environments. Thus, in particular, waste toner that has deteriorated in fluidity in a high-temperature high-humidity environment may solidify around a conveying screw (specifically, for example, between turns of a helical blade) disposed inside a toner conveying path, and fall into a so-called blocking state, which inconveniently hinders the conveyance of toner.

To address such inconvenience, there have been proposed methods for suppressing blocking of toner, and for example, Patent Documents 1 and 2 identified below disclose methods for suppressing adhesion of toner to a conveying screw by making a film-shaped flicker contact the conveying screw.

According to Patent Document 2, a cleaning device adopts a configuration which includes two flickers, namely, a first flicker and a second flicker. The first and second flickers are in contact with each other, and contact a conveying screw at respective positions closer to their respective leading edges than their contact position to press the conveying screw (see FIG. 2 of Patent Document 2). By pressing the conveying screw, the two flickers scrape toner off a surface of the conveying screw, and thereby, adhesion of toner is effectively suppressed.

CITATION LIST

Patent Literature

Patent Document 1: Japanese unexamined patent application publication No. 2006-343371

Patent Document 2: Japanese unexamined patent application publication No. H04-172484

SUMMARY OF INVENTION

Technical Problem

With the method disclosed in Patent Document 2, however, if the first flicker and the second flicker press the conveying screw with forces of different magnitudes, it may cause the conveying screw to be deformed in one direction. Here, if the deformation of the conveying screw is caused in a direction opposite to a direction toward an inner wall of a toner conveying path, a gap between the conveying screw and the inner wall of the toner conveying path may be widened, and around the widened gap, toner may accumulate to degrade toner conveying performance, or may stick to cause toner discharge failure.

Note that, although the above description has dealt with toner discharge failure occurring during conveyance of waste toner removed by a cleaning device, in a high-temperature high-humidity environment, a similar problem may occur also during conveyance of toner to be replenished to a developing device.

In view of the above problems, an object of the present invention is to provide a toner conveying device capable of suppressing occurrence of toner discharge failure and also capable of maintaining preferable toner conveying performance, a cleaning device including the same, and an image forming apparatus.

Solution to Problem

To achieve the above object, according to a first configuration of the present invention, a toner conveying device includes a toner conveying path, a conveying screw, and a flicker. In the toner conveying path, toner is conveyed. The conveying screw includes a rotation shaft rotatably arranged inside the toner conveying path and a helical blade formed on an outer circumferential surface of the rotation shaft. In the flicker, a large number of contact pieces are formed at predetermined intervals along an axial direction of the conveying screw, the contact pieces being swingable in contact with an outer circumferential surface of the conveying screw. The flicker includes a plurality of first contact pieces that contact the conveying screw and press the conveying screw in a first direction toward a bottom of the toner conveying path, and a plurality of second contact pieces that contact the conveying screw from a side opposite to the first contact pieces and press the conveying screw in a second direction opposite to the first direction. a force with which the first contact pieces press the conveying screw is greater than a force with which the second contact pieces press the conveying screw.

Advantageous Effects of the Invention

According to the first configuration of the present invention, the pressing force of the first contact pieces in the first direction is larger than the pressing force of the second contact pieces in the second direction, and this helps prevent the conveying screw from being elastically deformed in the second direction so as to move away from the bottom of the toner conveying path. This makes it less likely for a gap between the conveying screw and the bottom of the toner conveying path to widen, and thus deterioration of toner conveying performance is suppressed and poor discharge of toner can be prevented.

DESCRIPTION OF EMBODIMENTS

Figure 1:
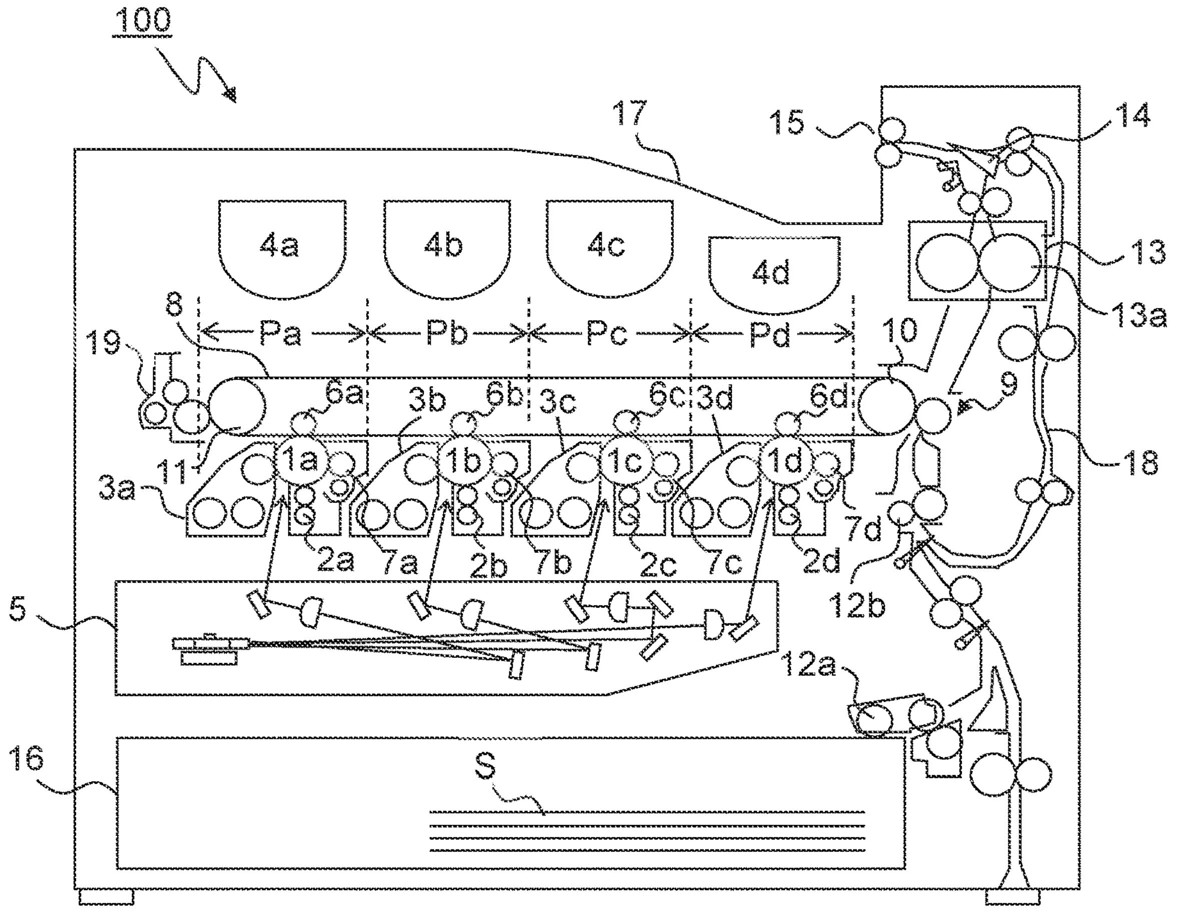
FIG. 1 is a schematic sectional view of an image forming apparatus 100 incorporating cleaning devices 7*a* to 7*d* according to the present invention.

Hereinafter, a description will be given of a first embodiment of the present invention with reference to the accompanying drawings. FIG. 1 is a schematic sectional view of an image forming apparatus 100 incorporating cleaning devices 7*a* to 7*d* according to the present invention. In a main body of the image forming apparatus 100, image forming portions Pa, Pb, Pc, and Pd are arranged in this order from an upstream side in a conveyance direction (a left side in FIG. 1). These image forming portions Pa to Pd are disposed corresponding to images of four different colors (magenta, cyan, yellow, and black), and the image forming portions Pa to Pd sequentially form magenta, cyan, yellow, and black images through charging, exposing, developing, and transferring processes.

In the image forming portions Pa to Pd, there are arranged photosensitive drums (image carriers) 1*a*, 1*b*, 1*c*, and 1*d*, which each carry a visible image (a toner image) of a corresponding one of the four different colors. There is further disposed an intermediate transfer belt 8 adjacent to the image forming portions Pa to Pd, and the intermediate transfer belt 8 is rotatable counterclockwise in FIG. 1. Toner images formed on the photosensitive drums 1*a* to 1*d* are sequentially transferred onto the intermediate transfer belt 8 moving in contact with the photosensitive drums 1*a* to 1*d*, and then, at a secondary transfer unit 9, the toner images are transferred all at once onto a sheet S as an example of a recording medium. Further, at a fixing portion 13, the toner images are fixed on the sheet S, and then the sheet S is discharged out of the main body of the image forming apparatus 100. With the photosensitive drums 1*a* to 1*d* rotating clockwise in FIG. 1, an image forming process is performed with respect to each of the photosensitive drums 1*a* to 1*d*.

Sheets S onto which toner images are to be transferred are stored in a sheet cassette 16 arranged in a lower part inside the image forming apparatus 100, and the sheets S are each conveyed to the secondary transfer unit 9 via a sheet feeding roller 12*a* and a pair of registration rollers 12*b*.

Next, a description will be given of image forming steps in the image forming apparatus 100. When an instruction to start image formation is input by a user, first, the photosensitive drums 1*a* to 1*d* are caused to rotate by a main motor (not shown), and surfaces of the photosensitive drums 1*a* to 1*d* are uniformly charged by charging rollers 21 (see FIG. 2) of charging devices 2*a* to 2*d*. Next, the surfaces of the photosensitive drums 1*a* to 1*d* are irradiated with beam light (laser light) emitted from an exposure device 5, and thereby electrostatic latent images are formed on the photosensitive drums 1*a* to 1*d* corresponding to an image signal.

Developing devices 3*a* to 3*d* are each loaded with a predetermined amount of magenta, cyan, yellow, or black toner. When, as a result of toner-image formation described later, a proportion of toner in a two-component developer in each of the developing devices 3*a* to 3*d* has fallen below a prescribed value, toner is replenished from toner containers 4*a* to 4*d* to the developing devices 3*a* to 3*d*. The toner in the developer is supplied by a developing roller 25 (see FIG. 2) of each of the developing devices 3*a* to 3*d* onto each of the photosensitive drums 1*a* to 1*d* and electrostatically adheres thereto. Thereby, toner images are formed corresponding to the electrostatic latent images formed by exposure to light from the exposure device 5.

Then, by primary transfer rollers 6*a* to 6*d*, an electric field is applied at a predetermined transfer voltage between themselves and the photosensitive drums 1*a* to 1*d*, and the toner images of magenta, cyan, yellow, and black on the photosensitive drums 1*a* to 1*d* are primarily transferred onto the intermediate transfer belt 8. These images of the four different colors are formed in a predetermined positional relationship with each other determined in advance for formation of a predetermined full-color image. Thereafter, in preparation for formation of new electrostatic latent images to be subsequently performed, residual toners left on the surfaces of the photosensitive drums 1*a* to 1*d* are removed by cleaning blades 28 (see FIG. 2) of the cleaning devices 7*a* to 7*d*.

When the intermediate transfer belt 8 starts to rotate counterclockwise along with rotation of a driving roller 10 caused by a belt driving motor (not shown), a sheet S is conveyed from the pair of registration rollers 12*b* at predetermined timing to the secondary transfer unit 9 disposed adjacent to the intermediate transfer belt 8, where a full-color image is transferred onto the sheet S. The sheet S having the transferred toner images thereon is conveyed to the fixing portion 13. Residual toner left on the surface of the intermediate transfer belt 8 is removed by a belt cleaning unit 19.

The sheet S conveyed to the fixing portion 13 is heated and pressed by a pair of fixing rollers 13*a* to thereby have the toner images fixed to the surface thereof and the predetermined full-color image is formed. The sheet S having the full-color image formed thereon has its conveying direction switched by a branch portion 14 branching into a plurality of directions, so that the sheet S is discharged as it is (or after being sent into a duplex-printing conveying path 18 and subjected to duplex printing) onto a discharge tray 17 by a pair of discharge rollers 15.

Figure 2:
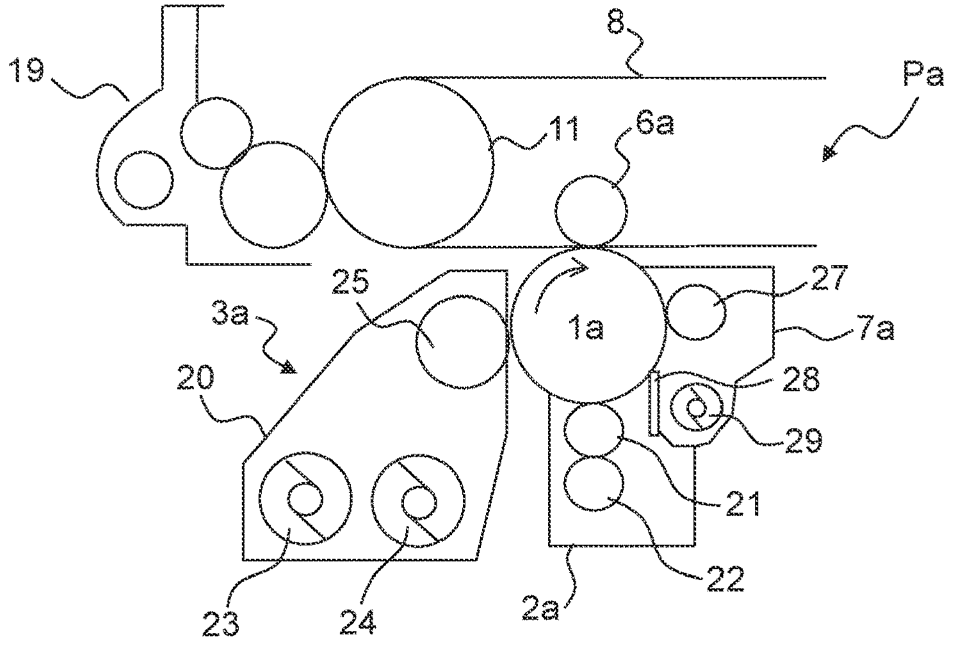
FIG. 2 is an enlarged view of the vicinity of an image forming portion Pa shown in FIG. 1.
Figure 3:
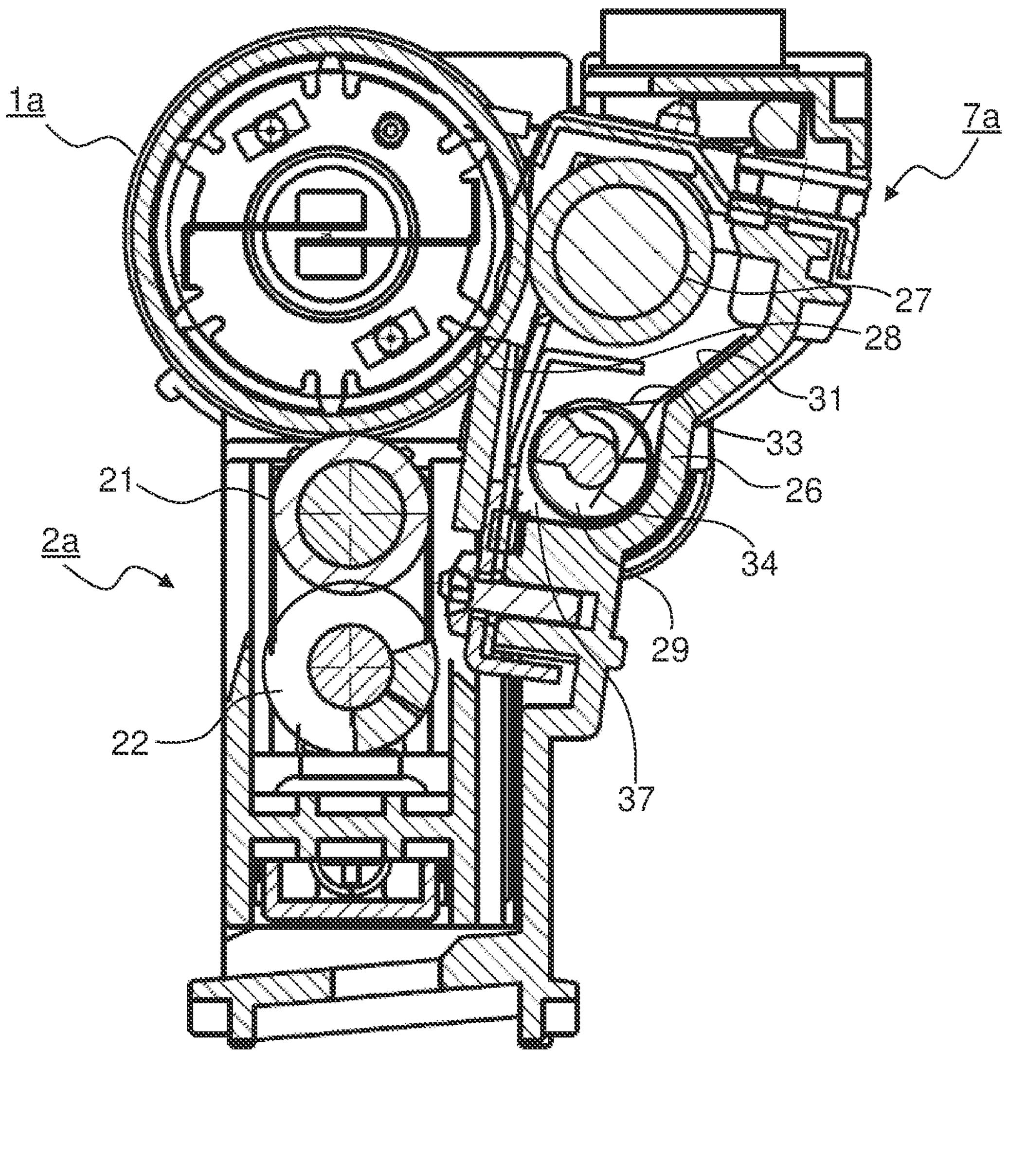
FIG. 3 is a side sectional view showing a configuration around the cleaning device 7*a* according to a first embodiment of the present invention shown in FIG. 2.

FIG. 2 is an enlarged view of the vicinity of the image forming portion Pa shown in FIG. 1. FIG. 3 is a side sectional view showing a configuration around the cleaning device 7*a* according to the first embodiment of the present invention shown in FIG. 2. Hereinafter, a detailed description will be given of the image forming portion Pa that includes the photosensitive drum 1*a*, the charging device 2*a*, and the cleaning device 7*a*. As to the image forming portions Pb to Pd, which are similar to the image forming portion Pa in configuration, descriptions will be omitted.

As shown in FIG. 2, around the photosensitive drum 1*a*, along its rotation direction (clockwise in FIG. 2), the charging device 2*a*, the developing device 3*a*, and the cleaning device 7*a* are arranged, and, opposite the photosensitive drum 1*a* with respect to the intermediate transfer belt 8, a primary transfer roller 6*a* is arranged. Further, on an upstream side with respect to the photosensitive drum 1*a* in a rotation direction of the intermediate transfer belt 8, the belt cleaning unit 19 is arranged opposite a tension roller 11 with respect to the intermediate transfer belt 8.

The photosensitive drum 1*a* is formed by laying a photosensitive layer on an outer circumferential surface of a base drum made of aluminum. Used as the photosensitive layer is, for example, an organic photoconductor (OPC) layer using an organic photoconductor, or an inorganic photoconductive layer such as an amorphous silicon (a-Si) photoconductive layer formed by vapor deposition or the like using silane gas or the like.

The charging device 2*a* includes the charging roller 21 that contacts the photosensitive drum 1*a* and applies a charging bias to a drum surface, and a brush roller 22 for cleaning the charging roller 21. The developing device 3*a* includes, in a developing container 20, two stirring-conveying members composed of a stirring-conveying screw 23 and a supply-conveying screw 24, and the developing roller 25; the developing device 3*a* causes toner carried on a surface of the developing roller 25 to jump to the surface of the photosensitive drum 1*a* to develop an electrostatic latent image into a toner image.

As shown in FIG. 2 and FIG. 3, the cleaning device 7*a* includes a housing 26, a rubbing roller 27 (a toner removing mechanism), a cleaning blade 28, a conveying screw 29, and a flicker 31. The housing 26 includes an opening facing the photosensitive drum 1*a*, and a toner conveying path 37 in which the rubbing roller 27, the cleaning blade 28, the conveying screw 29, and the flicker 31 are contained.

The rubbing roller 27 is in contact with the surface (an outer circumferential surface) of the photosensitive drum 1*a* via the opening of the housing 26, and is rotatably supported by side panels (not shown) of the housing 26 in a front-rear direction thereof (a direction perpendicular to the plane of the sheet on which FIG. 3 is drawn). The rubbing roller 27 is driven to rotate by an unillustrated driving means in a same direction (a with direction) as observed on the plane of contact between the rubbing roller 27 and the photosensitive drum 1*a*, to thereby remove residual toner on the surface of the photosensitive drum 1*a* and rub and polish the surface of the photosensitive drum 1*a*. The residual toner removed by the rubbing roller 27 is conveyed as waste toner into the toner conveying path 37 of the housing 26 via the opening, to be stored inside the toner conveying path 37.

A linear velocity of the rubbing roller 27 is controlled so as to be higher than (for example, 1.2 times as high as) a linear velocity of the photosensitive drum 1*a*. The rubbing roller 27 can have a structure in which, for example, as a roller body around a metal shaft, a foam layer is formed of EPDM rubber having an Asker C hardness of 55°. The roller body is not limited in material to EPDM rubber, but may be formed of any other type of rubber or may be formed as a foamed rubber body, and a favorably used material is one having an Asker C hardness in a range of 10° to 90°.

The cleaning blade 28 is in contact with the photosensitive drum 1*a* at a position downstream, with respect to the rotation direction of the photosensitive drum 1*a* (clockwise in FIG. 3), from a contact part between the photosensitive drum 1*a* and the rubbing roller 27. Used as the cleaning blade 28 is, for example, a polyurethane rubber blade having a JIS hardness of 78° and a thickness of 2 mm. The cleaning blade 28 is set as appropriate in terms of its material, hardness, dimensions, and mounting angle with respect to, amount of biting into, and force of its pressure contact with, the photosensitive drum 1*a*, etc. depending on specifications of the photosensitive drum 1*a*.

Figure 4:
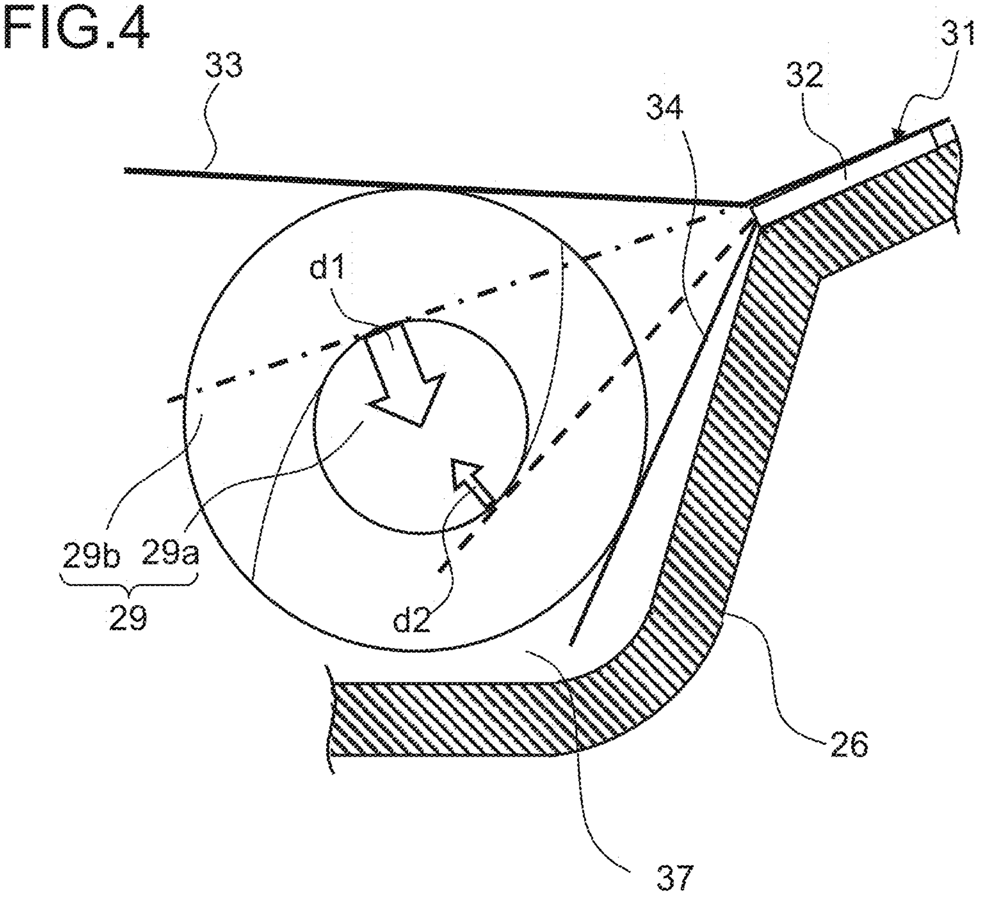
FIG. 4 is a partial enlarged view showing a conveying screw 29 and a flicker 31 of the cleaning device 7*a* according to the first embodiment of the present invention as seen from a radial direction (a direction perpendicular to a rotation shaft 29*a*).

FIG. 4 is a partial enlarged view showing the conveying screw 29 and the flicker 31 of the cleaning device 7*a* as seen from a radial direction (a direction perpendicular to a rotation shaft 29*a*). The two white arrows in FIG. 4 indicate the force with which the first contact pieces 33 press the conveying screw 29 (larger arrow) and the force with which the second contact pieces 34 press the conveying screw 29 (smaller arrow), respectively. The size of each arrow indicates the magnitude of the force. The conveying screw 29 includes the rotation shaft 29*a* and a helical blade 29*b* in a helical shape that is integrally formed on an outer circumferential surface of the rotation shaft 29*a*. The rotation shaft 29*a* is rotatably supported by the side panels of the housing 26 in the front-rear direction thereof. Waste toner stored in the toner conveying path 37 is conveyed in the axial direction along with rotation of the conveying screw 29, and is discharged out of the cleaning device 7*a*.

The flicker 31 includes a base portion 32 secured to an inner wall of the housing 26, and a first contact piece 33 and a second contact piece 34 both extending from the base portion 32 toward the conveying screw 29. The base portion 32 is an axially elongated rectangular plate body, and is secured to the inner wall of the housing 26 with an adhesive or the like. The first contact piece 33 and the second contact pieces 34 are each a rectangular plate-shaped body connected to the base portion 32. The first contact piece 33 and the second contact piece 34 each have a free leading edge extending to a position at which they contact the conveying screw 29.

The first contact piece 33 is in contact with the conveying screw 29 at a position that is closer to the opening of the housing 26 than the rotation shaft 29*a* is, in other words, at a position that is farther away from a bottom of the housing 26 (a bottom of the toner conveying path 37) than the rotation shaft 29*a* is. The first contact piece 33 presses the conveying screw 29 from this position of its contact with the conveying screw 29 toward the bottom of the housing 26 (the bottom of the toner conveying path 37). This direction in which the first contact piece 33 presses the conveying screw 29 will be referred to as a first direction d1.

The second contact piece 34 is in contact with the conveying screw 29 at a position that is farther away from the opening of the housing 26 than the rotation shaft 29*a* is, in other words, at a position that is closer to the bottom of the housing 26 (the bottom of the toner conveying path 37) than the rotation shaft 29*a* is. The second contact piece 34 presses the conveying screw 29 from this position of its contact with the conveying screw 29 in a direction toward the opening of the housing 26, which is a direction opposite to the first direction d1. This direction in which the second contact piece 34 presses the conveying screw 29 will be referred to as a second direction d2.

Figure 5:
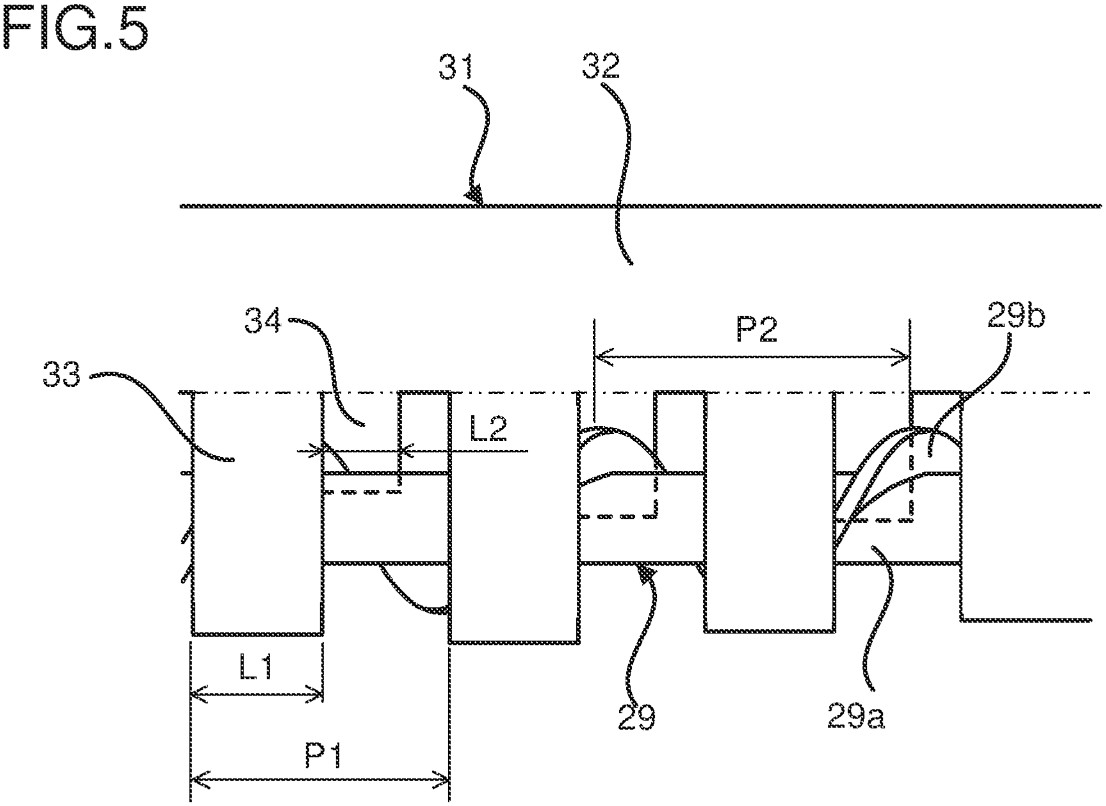
FIG. 5 is a plan view, as seen from above, of the conveying screw 29 and the flicker 31 shown in FIG. 4.
Figure 6:
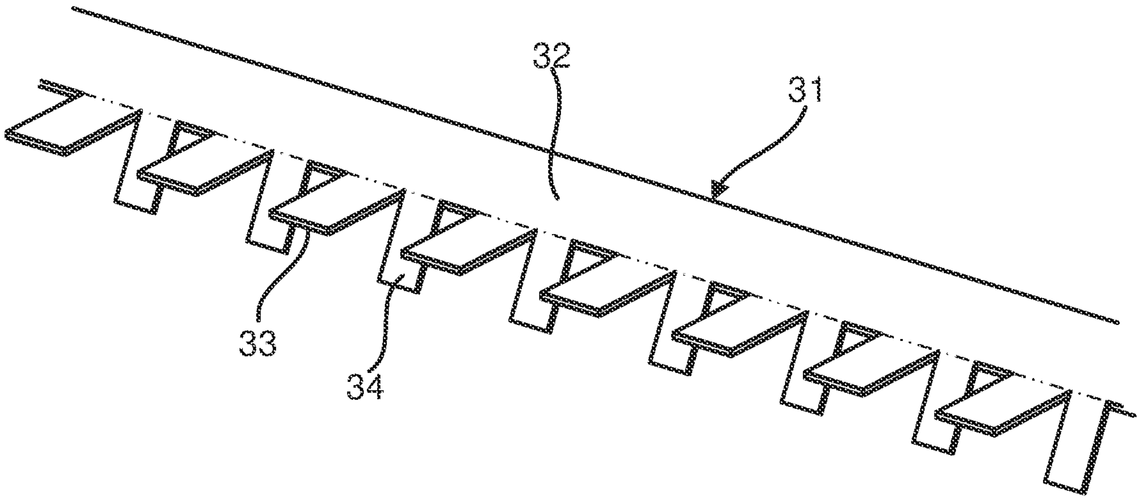
FIG. 6 is a perspective view showing the flicker 31 of the cleaning device 7*a* according to the first embodiment of the present invention.

FIG. 5 is a plan view, as seen from above, of the conveying screw 29 and the flicker 31 shown in FIG. 4. FIG. 6 is a perspective view showing the flicker 31. The first contact piece 33 and the second contact piece 34 respectively include a plurality of first contact pieces 33 and a plurality of second contact pieces 34 disposed at predetermined intervals over an entire region in the axial direction of the conveying screw 29 (a direction perpendicular to the plane of the surface on which FIG. 4 is drawn). An interval P1 at which the first contact pieces 33 are disposed in the axial direction is equal to or smaller than a pitch P2 of the helical blade 29*b* in the axial direction. An interval at which the second contact pieces 34 are disposed in the axial direction is substantially equal to the interval P1 at which the first contact pieces 33 are disposed in the axial direction.

Regarding a material of the first contact pieces 33 and the second contact pieces 34, there is no particular limitation as long as it is an elastic material swingable in contact with the helical blade 29*b* of the conveying screw 29; as the material, there can be used various types of synthetic resin sheets having a small friction resistance such as, for example, a polyethylene terephthalate (PET) sheet (a Lumirror sheet), a Teflon sheet, and a Kapton sheet, among which the Lumirror sheet is preferable in terms of cost, durability, etc.

The first contact pieces 33 and the second contact pieces 34 are lifted by the helical blade 29*b* along with rotation of the conveying screw 29, and repeatedly and alternately assume a state of being lifted by the helical blade 29*b* to be elastically deformed (solid lines in FIG. 4) and a state of being in contact with the rotation shaft 29*a* under resilience (a dashed-dotted line and a dashed line in FIG. 4), and thereby swing between the conveying screw 29 and the rubbing roller 27 while being elastically deformed in accordance with a rotation cycle of the rotation shaft 29*a*. The first contact pieces 33 and the second contact pieces 34 warp more and thus press the conveying screw 29 with a greater pressing force when they are in the state of being lifted by the helical blade 29*b* than when they are in the state of being in contact with the rotation shaft 29*a*.

An elasticity coefficient of the first contact pieces 33 is set to be larger than an elasticity coefficient of the second contact pieces 34. Lengths, widths, and thicknesses of the first contact pieces 33 and the second contact pieces 34 are set to values with which the elasticity coefficient of the first contact pieces 33 is larger than that of the second contact pieces 34. Specifically, regarding those dimensions, the following configuration can be adopted.

A width L1 of the first contact pieces 33 is 1.3 to 1.7 times as large as a width L2 of the second contact pieces 34, and a thickness of the first contact pieces 33 is 1.0 to 2.0 times as large as a thickness of the second contact pieces 34. A length of the first contact pieces 33 (a length from a border between each of the first contact pieces 33 and the base portion 32 to the leading edge of each of the first contact pieces 33) is 1.0 to 1.4 times (preferably, 1.1 to 1.3 times) as large as a length of the second contact pieces 34 (a length from a border between each of the second contact pieces 34 and the base portion 32 to the leading edge of each of the second contact pieces 34).

Here, for the elasticity coefficient of the first contact pieces 33 to be larger than that of the second contact pieces 34 and for efficient scraping off of residual toner left on the surface of the conveying screw 29, it is preferable to adopt a configuration where the width L1 of the first contact pieces 33 is 1.4 to 1.6 times as large as the width L2 of the second contact pieces 34, the thickness of the first contact pieces 33 is 1.3 to 1.7 times as large as that of the second contact pieces 34, and the length of the first contact pieces 33 is 1.1 to 1.3 times as large as that of the second contact pieces 34.

The width L1 of the first contact pieces 33 is equal to or larger than one-third but equal to or smaller than two-thirds of the pitch P2 of the helical blade 29*b*. The first contact pieces 33 and the second contact pieces 34 are alternately disposed so as not to overlap with each other in the axial direction.

As described above, the elasticity coefficient of the first contact pieces 33 is larger than that of the second contact pieces 34. In a case where the first contact pieces 33 and the second contact pieces 34 are elastically deformed by a same warp amount, a force with which the first contact pieces 33 press the conveying screw 29 is greater than a force with which the second contact pieces 34 press the conveying screw 29.

As described above, the force with which the first contact pieces 33 press the conveying screw 29 in the first direction d1 is set to be larger than the force with which the second contact pieces 34 press the conveying screw 29 in the second direction d2. As a result, the conveying screw 29 is unlikely to become deformed in the second direction d2. Thus, it is possible to suppress widening of a gap between the inner wall of the housing 26 (the bottom of the toner conveying path 37) and the conveying screw 29 so as to suppress deterioration of toner conveying performance caused by accumulation of toner and suppress occurrence of poor discharge of toner.

Some conventional cleaning devices include two flickers that are formed in contact with each other. These flickers are in contact with a conveying screw at positions that are closer to their leading edges than their contact position is. With such a configuration, waste toner scraped off a surface of the conveying screw accumulates, for example, in a gap formed at the contact position of the two flickers, and this may prevent conveyance of waste toner to invite poor discharge of toner.

Here, in the flicker 31 according to the cleaning device 7*a* of the present invention, as described above, the first contact pieces 33 and the second contact pieces 34 are separately in contact with the conveying screw 29. Furthermore, the first contact pieces 33 and the second contact pieces 34 are alternately disposed so as not to overlap with each other in the axial direction, and are not in contact with each other. Thus, by adopting the flicker 31 according to the present embodiment, it is possible to prevent occurrence of poor discharge of toner that has been experienced with the above-described conventional flicker.

Figure 7:
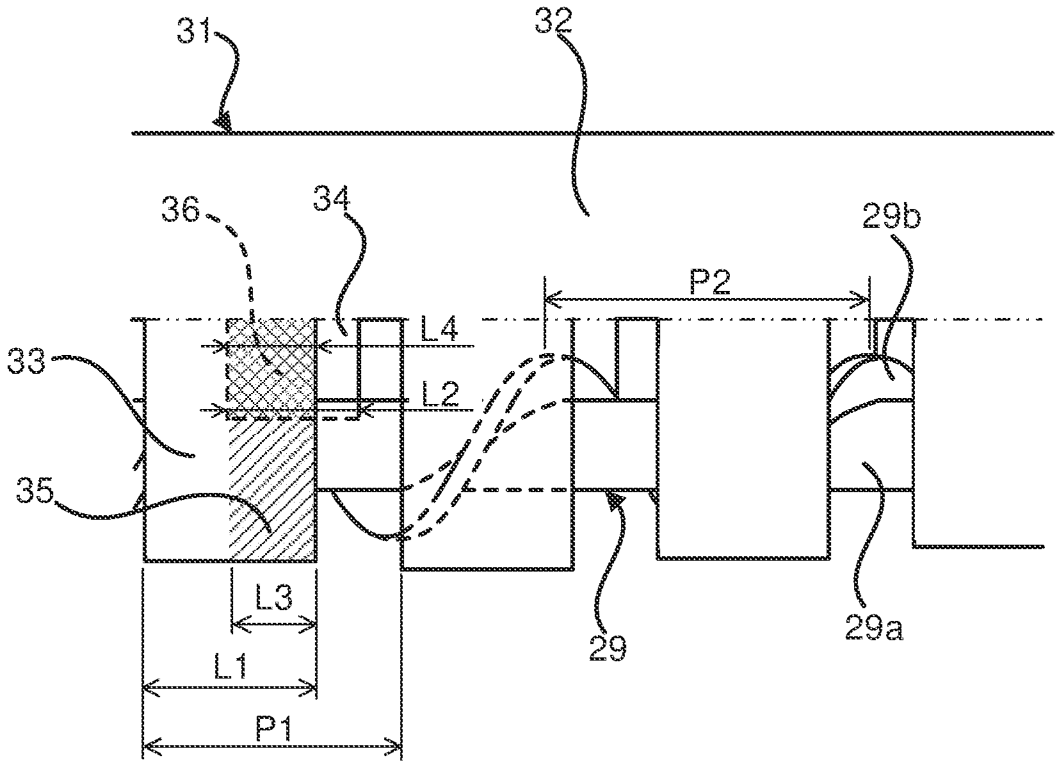
FIG. 7 is a plan view of a conveying screw 29 and a flicker 31 of a cleaning device 7*a* according to a second embodiment of the present invention.
Figure 8:
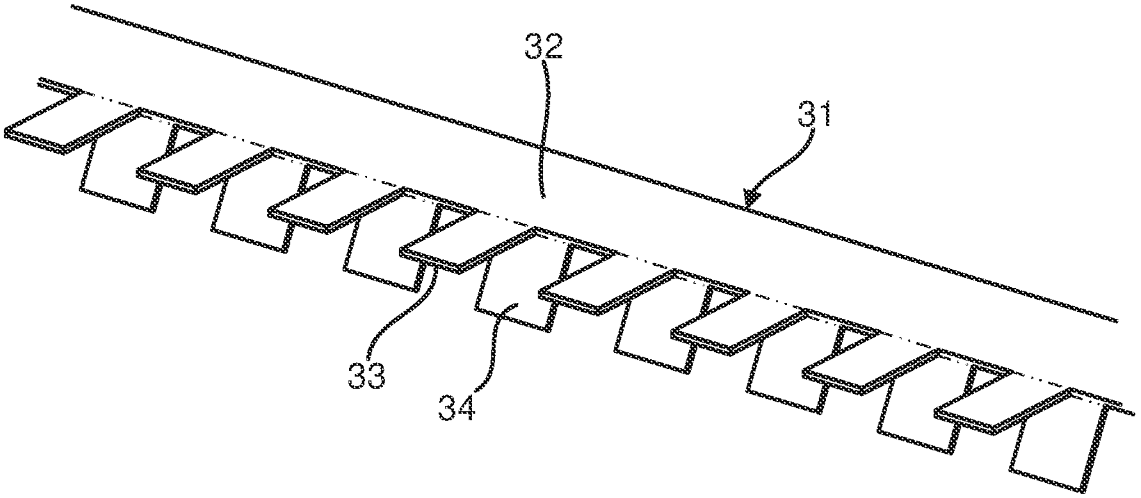
FIG. 8 is a perspective view of the flicker 31 of the cleaning device 7*a* according to the second embodiment of the present invention.

Next, using FIGS. 7 and 8, a description will be given of a second embodiment of the present invention. FIG. 7 is a plan view of the conveying screw 29 and the flicker 31 of the cleaning device 7*a* according to the second embodiment of the present invention. FIG. 8 is a perspective view of the flicker 31 of the cleaning device 7*a* according to the second embodiment of the present invention. The width L1 of the first contact pieces 33 is equal to or larger than one-half but equal to or smaller than two-thirds of the pitch P2 of the helical blade 29*b*.

The first contact pieces 33 and the second contact pieces 34 overlap with each other in the axial direction. A first side end part 35 (a hatched part in the figure) of the first contact pieces 33 located on one side in the axial direction and a second side end part 36 (a shaded part in the figure) of the second contact pieces 34 located on the other side in the axial direction overlap with each other. The first contact pieces 33 and the second contact pieces 34 are not in contact with each other. A width L3 of the first side end portion 35 and a width L4 of the second side end portion 36 are equal to or larger than one-third but equal to or smaller than two-thirds of the width L1 of the first contact pieces 33.

In this manner, by arranging the first contact pieces 33 and the second contact pieces 34 so as to overlap with each other, it is possible to make the width L1 of the first contact pieces 33 and the width L2 of the second contact pieces 34 comparatively large while reducing the interval P1 between adjacent ones of the first contact pieces 33. As a result, the first contact pieces 33 and the second contact pieces 34 contact the conveying screw 29 over a wider range. Thus, according to the second embodiment, the cleaning device 7*a* has a configuration capable of efficiently scraping toner off the surface of the conveying screw 29 and more effectively suppressing poor conveyance of toner.

Moreover, the first contact pieces 33 and the second contact pieces 34 are not in contact with each other. Thus, by adopting the flicker 31 according to the second embodiment, it is possible to solve the problem experienced with the conventional cleaning device described above, that is, the accumulation of waste toner at a contact part between two flickers.

Further, the embodiments described above are in no way meant to limit the present invention, which thus allows for many modifications and variations within the spirit of the present invention. For example, the above-described embodiments have dealt with only such configurations as are provided with the rubbing roller 27 and the cleaning blade 28 as a polishing system for the cleaning devices 7*a* to 7*d*, but the configuration of the present invention is applicable to cleaning devices of various configurations having the conveying screw 29; examples of such configurations include a configuration provided with only the rubbing roller 27 or the cleaning blade 28, a configuration provided with, instead of the rubbing roller 27, a cleaning roller having a cleaning function alone, a configuration provided with a fur brush instead of the cleaning blade 28, etc.

Moreover, the width L1, the thickness, and the length of the first contact pieces 33, and the width L2, the thickness, and the length of the second contact pieces 34 are not limited to the above-mentioned respective dimensions, but may be set to the following dimensions instead, for example, as long as the elasticity coefficient of the first contact pieces 33 can be larger than that of the second contact pieces 34.

The width L1 of the first contact pieces 33 can be substantially equal to the width L2 of the second contact pieces 34, and the thickness of the first contact pieces 33 can be 1.2 to 1.4 times as large as that of the second contact pieces 34.

Or, the width L1 of the first contact pieces 33 can be substantially equal to the width L2 of the second contact pieces 34, and the length of the first contact pieces 33 can be 1.1 to 1.3 times as large as that of the second contact pieces 34. In this case, the thickness of the first contact pieces 33 and that of the second contact pieces 34 are substantially equal.

Or, the width L1 of the first contact pieces 33 can be substantially equal to the width L2 of the second contact pieces 34, the length of the first contact pieces 33 can be substantially equal to that of the second contact pieces 34, and the thickness of the first contact pieces 33 can be 1.1 to 1.5 times as large as that of the second contact pieces 34.

Further, if the force with which the first contact pieces 33 press the conveying screw 29 in the first direction d1 is larger than the force with which the second contact pieces 34 press the conveying screw 29 in the second direction d2, a configuration can be adopted in which the elasticity coefficient of the first contact pieces 33 is equal to or smaller than that of the second contact pieces 34.

In this case, the first contact pieces 33 and the second contact pieces 34 can be arranged such that a maximum warp amount of the first contact pieces 33 (a warp amount of the first contact pieces 33 when they are in contact with a leading edge of the helical blade 29*b*) is equal to or larger than a maximum warp amount of the second contact pieces 34 (a warp amount of the second contact pieces 34 when they are in contact with the leading edge of the helical blade 29*b*). In this case, a minimum warp amount of the first contact pieces 33 (a warp amount of the first contact pieces 33 when they are in contact with the rotation shaft 29*a*) is equal to or larger than a minimum warp amount of the second contact pieces 34 (a warp amount of the second contact pieces 34 when they are in contact with the rotation shaft 29*a*). With this arrangement, the force with which the first contact pieces 33 press the conveying screw 29 can be larger than the force with which the second contact pieces 34 press the conveying screw 29, and this helps suppress deformation of the conveying screw 29 in the second direction d2.

Further, the application of the present invention is by no means limited to the cleaning devices 7*a* to 7*d*, but the present invention is applicable also to various types of toner conveying devices such as a waste toner conveying portion that conveys waste toner from the cleaning devices 7*a* to 7*d* to a waste toner container, toner replenishing portions that replenish toner from toner containers 4*a* to 4*d* to the developing devices 3*a* to 3*d*, etc. Shown in FIG. 9 is an example in which the present invention is applied to toner replenishing paths for replenishing toner to the developing devices 3*a* to 3*d*.

Figure 9:
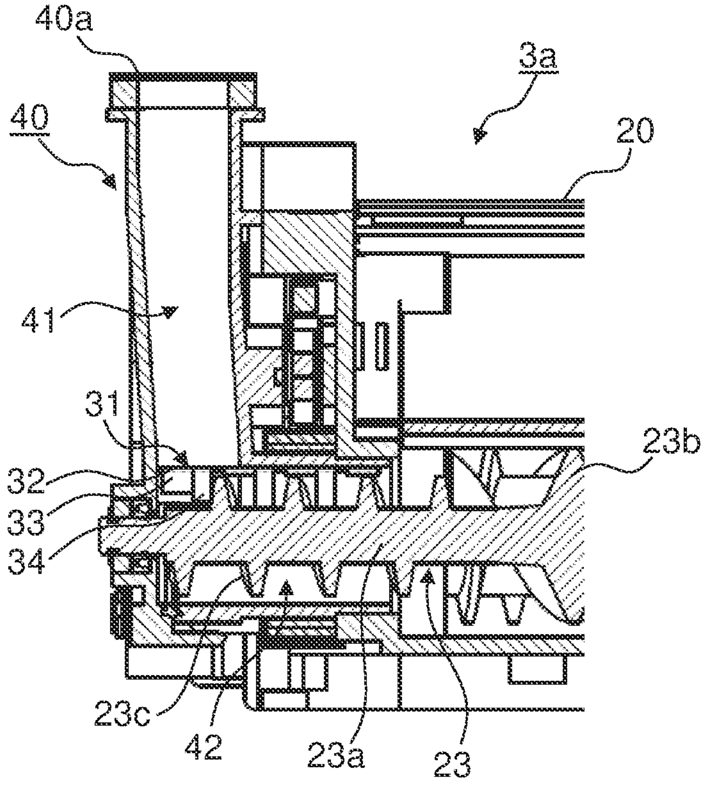
FIG. 9 is a partial sectional view of a part including a toner replenishing portion 40 of a developing device 3*a* of a case where the present invention is applied to toner replenishing paths for replenishing toner to developing devices 3*a* to 3*d*.

FIG. 9 is a partial sectional view of a part including a toner replenishing portion 40 of the developing device 3*a*. As shown in FIG. 9, the toner replenishing portion 40 includes a vertical conveying portion 41 that vertically conveys (drops) toner supplied from the toner container 4*a* (see FIG. 1) via a toner replenishing port 40*a*, and a horizontal conveying portion 42 that horizontally conveys toner received from the vertical conveying portion 41.

The stirring conveying screw 23 has a rotation shaft 23*a* that extends into the horizontal conveying portion 42. Such part of the rotation shaft 23*a* of the stirring conveying screw 23 as is arranged inside the horizontal conveying portion 42 of the rotation shaft 23*a* has a replenishing blade 23*c* integrally formed therewith. The replenishing blade 23*c* is formed of a helical blade facing a same direction (wound in a same direction) as a helical blade 23*b*, and is also formed with a smaller pitch and a smaller diameter than the helical blade 23*b*.

Hereinafter, effects of the present invention will be described in more detail through examples.

EXAMPLES

A research was conducted regarding a relationship between the widths, projecting lengths, and thicknesses of the first contact pieces 33 and the second contact pieces 34 of the flicker 31 and toner conveyance effect. Tests were conducted by the following method, using the image forming apparatus 100 (a color printer) as shown in FIG. 1, incorporating the cleaning devices 7*a* to 7*d*: occurrence of toner accumulation in the housing 26 and occurrence of rubbing of the housing 26 were evaluated in a case where the force with which the first contact pieces 33 pressed the conveying screw 29 was larger than the force with which the second contact pieces 34 pressed the conveying screw 29 (present inventions 1 to 5), in a case where the force with which the first contact pieces 33 pressed the conveying screw 29 was smaller than the force with which the second contact pieces 34 pressed the conveying screw 29 (comparative examples 1 and 2), and in a case where the force with which the first contact pieces 33 pressed the conveying screw 29 was excessively larger than the force with which the second contact pieces 34 pressed the conveying screw 29 (a comparative example 3).

The first contact pieces 33 and the second contact pieces 34 were arranged such that the maximum warp amount (deformation amount) of the second contact pieces 34 was larger than the maximum warp amount (the deformation amount) of the first contact pieces 33.

In the present inventions 1 to 5 and the comparative examples 1 to 3, the evaluation was conducted with the first contact pieces 33 having a width of 5 to 8 mm, a projecting length of 8 to 10 mm, a thickness of 75 to 100 μm, and the second contact pieces 34 having a width of 5 to 7.5 mm, a projecting length of 10 to 12 mm, and a thickness of 100 to 120 μm.

The evaluation criteria were as follows: A. Neither accumulation of toner inside the housing 26 of the cleaning device 7*a* nor rubbing of the housing 26 occurred; B. Accumulation of just a small amount of toner occurred; C. Accumulation of toner or rubbing of the housing 26 occurred. The results are shown in Table 1.

thickness of 100 μm, and the second contact pieces 34 had a width of 7.5 mm, a projecting length of 10 mm, and a thickness of 75 μm. That is, the thickness of the first contact pieces 33 was 1.33 times as large as that of the second contact pieces 34.

In the present invention 2, the first contact pieces 33 had a width of 5 mm, a projecting length of 12 mm, and a thickness of 100 μm, and the second contact pieces 34 had a width of 5 mm, a projecting length of 8 mm, and a thickness of 100 μm. That is, the projecting length of the first contact pieces 33 was 1.5 times as large as that of the second contact pieces 34.

In the present invention 3 to 5 and the comparative example 1, the first contact pieces 33 and the second contact pieces 34 were equal to each other in projecting length and different from each other in width and thickness.

In the present invention 3, the first contact pieces 33 had a width of 7.5 mm, a projecting length of 10 mm, and a thickness of 100 μm, and the second contact pieces 34 had a width of 5 mm, a projecting length of 10 mm, and a thickness of 75 μm. That is, the width of the first contact pieces 33 was 1.5 times as large as that of the second contact pieces 34, and the thickness of the first contact piece 33 was 1.33 times as large as that of the second contact pieces 34.

In the present invention 4, the first contact pieces 33 had a width of 7.5 mm, a projecting length of 10 mm, and a thickness of 120 μm, the second contact pieces 34 had a width of 5 mm, a projecting length of 10 mm, and a thickness of 75 μm. That is, the width of the first contact piece 33 was 1.5 times as large as that of the second contact pieces 34, and the thickness of the first contact pieces 33 was 1.6 times as large as that of the second contact pieces 34.

In the present invention 5, the first contact pieces 33 had a width of 7.5 mm, a projecting length of 10 mm, and a thickness of 120 μm, and the second contact pieces 34 had a width of 8 mm, a projecting length of 10 mm, and a thickness of 75 μm. That is, the width of the first contact pieces 33 was 0.94 times as large as that of the second contact pieces 34, and the thickness of the first contact pieces 33 was 1.6 times as large as that of the second contact pieces 34.

In the comparative example 1, the first contact pieces 33 had a width of 5 mm, a projecting length of 10 mm, and a thickness of 100 μm, and the second contact pieces 34 had

TABLE 1

| | First Contact Pieces 33 | | | Second Contact Pieces 34 | | | |
|---|---|---|---|---|---|---|---|
| | Width (mm) | Projecting Length (mm) | Thickness (μm) | Width (mm) | Projecting Length (mm) | Thickness (μm) | Evaluation |
| Present Invention 1 | 7.5 | 10 | 100 | 7.5 | 10 | 75 | A |
| Present Invention 2 | 5 | 12 | 100 | 5 | 8 | 100 | A |
| Present Invention 3 | 7.5 | 10 | 100 | 5 | 10 | 75 | A |
| Present Invention 4 | 7.5 | 10 | 120 | 5 | 10 | 75 | A |
| Present Invention 5 | 7.5 | 10 | 120 | 8 | 10 | 75 | A |
| Comparative Example 1 | 5 | 10 | 100 | 6 | 10 | 75 | B |
| Comparative Example 2 | 7.5 | 10 | 100 | 7.5 | 10 | 100 | C |
| Comparative Example 3 | 7.5 | 12 | 120 | 5 | 10 | 75 | C |

As shown in Table 1, in the present inventions 1 and 2, the first contact pieces 33 and the second contact pieces 34 were equal to each other in width but were different from each other in projecting length and thickness.

In the present invention 1, the first contact pieces 33 had a width of 7.5 mm, a projecting length of 10 mm, and a a width of 6 mm, a projecting length of 10 mm, and a thickness of 75 μm. That is, the width of the first contact pieces 33 was 0.83 times as large as that of the second contact pieces 34, and the thickness of the first contact pieces 33 was 1.33 times as large as that of the second contact pieces 34.

In the comparative example 2, the first contact pieces 33 and the second contact pieces 34 were equal to each other in all of width, projecting length, and thickness. In the comparative example 3, the first contact pieces 33 were different from the second contact pieces 34 in all of width, projecting length, and thickness.

In the comparative example 2, the first contact pieces 33 and the second contact pieces 34 had a width of 7.5 mm, a projecting length of 10 mm, and a thickness of 100 μm.

In the comparative example 3, the first contact pieces 33 had a width of 7.5 mm, a projecting length of 12 mm, and a thickness of 120 μm, and the second contact pieces 34 had a width of 5 mm, a projecting length of 10 mm, and a thickness of 75 μm. That is, the width of the first contact pieces 33 was 1.5 time as large as that of the second contact pieces 34, the projecting length of the first contact pieces 33 was 1.2 times as large as that of the second contact pieces 34, and the thickness of the first contact pieces 33 was 1.6 times as large as that of the second contact pieces 34.

In the present inventions 1 to 5, neither accumulation of toner nor rubbing occurred in the housing 26. Meanwhile, in the comparative example 1, accumulation of just a small amount of toner occurred, but in the comparative example 2, toner accumulation occurred. On the other hand, in the comparative example 3, toner accumulation did not occur, but rubbing of the conveying screw 29 against the housing 26 occurred.

As described above, in the present inventions 1 to 4, the first contact pieces 33 were larger than the second contact pieces 34 at least in one of width, projecting length, and thickness. As a result, the elasticity coefficient of the first contact pieces 33 was larger than that of the second contact pieces 34, and the force with which the first contact pieces 33 pressed the conveying screw 29 was greater than the force with which the second contact pieces 34 pressed the conveying screw 29. Thus, deformation of the conveying screw 29 in the second direction d2 was suppressed, so that the gap between the housing 26 and the conveying screw 29 did not widen, and accumulation of toner was able to be suppressed.

In the present invention 5, the width of the first contact pieces 33 was 0.94 times as large as that of the second contact pieces 34 and was comparatively small, but the thickness of the first contact pieces 33 was 1.6 times as large as that of the second contact pieces 34 and was comparatively large. As a result, in the present invention 5, as in the present inventions 1 to 4, the elasticity coefficient of the first contact pieces 33 was larger than that of the second contact pieces 34, and thus the force with which the first contact pieces 33 pressed the conveying screw 29 was greater than the force with which the second contact pieces 34 pressed the conveying screw 29. As a result, accumulation of toner was successfully suppressed.

In the comparative example 1, the thickness of the first contact pieces 33 was 1.33 times as large as that of the second contact pieces 34, but the width of the first contact pieces 33 was 0.83 times as large as that of the second contact pieces 34 and was comparatively small, and thus the elasticity coefficient of the first contact pieces 33 was smaller than that of the second contact pieces 34. As a result, the force with which the first contact pieces 33 pressed the conveying screw 29 was a little smaller than the force with which the second contact pieces 34 pressed the conveying screw 29. It can be construed that this caused the conveying screw 29 to be deformed in the second direction d2 to widen the gap between the housing 26 and the conveying screw 29 so that accumulation of a small amount of toner occurred.

In the comparative example 2, the first contact pieces 33 and the second contact pieces 34 were equal to each other in width, projecting length, and thickness, and their elasticity coefficients were also equal to each other. As described above, the maximum warp amount (the deformation amount) of the second contact pieces 34 was larger than the maximum warp amount (the deformation amount) of the first contact pieces 33. As can be drawn from Hooke's law (Stress $\tau$=Elasticity Coefficient G×Deformation Amount $\gamma$), the force with which the first contact pieces 33 pressed the conveying screw 29 was greater than the force with which the second contact pieces 34 pressed the conveying screw 29. Accordingly, it can be construed that the conveying screw 29 was deformed in the second direction d2 to widen the gap between the housing 26 and the conveying screw 29 so that toner accumulation occurred.

In the comparative example 3, in all of width, projecting length and thickness, and in elasticity coefficient as well, the first contact pieces 33 were larger than the second contact pieces 34. Thus, as in the present inventions 1 to 5, deformation of the conveying screw 29 in the second direction d2 was suppressed, and accumulation of toner was successfully suppressed. However, the force with which the first contact pieces 33 pressed the conveying screw 29 was excessively greater than the force with which the second contact pieces 34 pressed the conveying screw 29. As a result, the conveying screw 29 was deformed in the first direction d1 by a comparatively large amount, bringing the conveying screw 29 into contact with the housing 26. It can be construed that this caused the rubbing in the housing 26.

INDUSTRIAL APPLICABILITY

The present invention is usable in a toner conveying device that conveys waste toner scraped off a surface of an image carrier or toner to be replenished to a developing device. By using the present invention, it is possible to provide a toner conveying device capable of effectively preventing solidification of toner to maintain stable toner conveying performance, and a cleaning device and an image forming apparatus that are provided with the toner conveying device.

The invention claimed is:

1. A toner conveying device, comprising:
a toner conveying path in which toner is conveyed;
a conveying screw that includes a rotation shaft rotatably arranged inside the toner conveying path, and a helical blade formed on an outer circumferential surface of the rotation shaft; and
a flicker in which a large number of contact pieces are formed at predetermined intervals along an axial direction of the conveying screw, the contact pieces being swingable in contact with an outer circumferential surface of the conveying screw,
wherein
the flicker includes
a plurality of first contact pieces that contact the conveying screw and press the conveying screw in a first direction toward a bottom of the toner conveying path, and a plurality of second contact pieces that contact the conveying screw from a side opposite to the first contact pieces and press the conveying screw in a second direction opposite to the first direction;

the first contact pieces and the second contact pieces are alternately disposed in the axial direction;

a side end part of each of the first contact pieces on one side in the axial direction is opposite to a side end part of one of the second contact pieces on an other side in the axial direction, on a one-to-one basis, with the rotation shaft interposed therebetween; and a force with which the first contact pieces press the conveying screw is greater than a force with which the second contact pieces press the conveying screw.

2. The toner conveying device according to claim 1, wherein the first contact pieces have an elasticity coefficient that is larger than an elasticity coefficient that the second contact pieces have; and the first contact pieces and the second contact pieces make contact alternately with the rotation shaft and the helical blade while being elastically deformed in accordance with a rotation cycle of the rotation shaft, and a warp amount of the first contact pieces when the first contact pieces are in contact with a leading edge of the helical blade is larger than a warp amount of the second contact pieces when the second contact pieces are in contact with the leading edge of the helical blade.

3. The toner conveying device according to claim 2, wherein a width of the first contact pieces in the axial direction is equal to or larger than a width of the second contact pieces in the axial direction.

4. The toner conveying device according to claim 2, wherein the first contact pieces are larger in thickness than the second contact pieces.

5. The toner conveying device according to claim 1, wherein the helical blade is formed in a helical shape with a constant pitch; and an interval at which the first contact pieces are disposed in the axial direction and an interval at which the second contact pieces are disposed in the axial direction are equal to or smaller than the pitch of the helical blade.

6. The toner conveying device according to claim 1, wherein an overlapping part between the side end part of each of the first contact pieces on the one side in the axial direction and the side end part of one of the second contact pieces on the other side in the axial direction, in a direction in which they are opposite to each other, has a width in the axial direction that is equal to or larger than one-half but equal to or smaller than two-thirds of an interval at which the first contact pieces are disposed in the axial direction.

7. A cleaning device, comprising:

a toner removing mechanism that is disposed so as to contact an image carrier and removes residual toner left on a surface of the image carrier;

a housing that houses the toner removing mechanism and stores the residual toner removed by the toner removing mechanism; and the toner conveying device according to claim 1 that conveys the residual toner stored inside the housing out of the housing.

8. An image forming apparatus comprising the cleaning device according to claim 7.

9. A toner conveying device, comprising:

a toner conveying path in which toner is conveyed;

a conveying screw that includes a rotation shaft rotatably arranged inside the toner conveying path, and a helical blade formed on an outer circumferential surface of the rotation shaft; and a flicker in which a large number of contact pieces are formed at predetermined intervals along an axial direction of the conveying screw, the contact pieces being swingable in contact with an outer circumferential surface of the conveying screw, wherein the flicker includes a plurality of first contact pieces that contact the conveying screw and press the conveying screw in a first direction toward a bottom of the toner conveying path, and a plurality of second contact pieces that contact the conveying screw from a side opposite to the first contact pieces and press the conveying screw in a second direction opposite to the first direction;

a width of the first contact pieces in the axial direction is larger than an interval at which the first contact pieces are disposed in the axial direction;

a width of the second contact pieces in the axial direction is larger than an interval at which the second contact pieces are disposed in the axial direction; and a force with which the first contact pieces press the conveying screw is greater than a force with which the second contact pieces press the conveying screw.

* * * * *